(12) United States Patent
Kiran et al.

(10) Patent No.: US 11,025,932 B2
(45) Date of Patent: Jun. 1, 2021

(54) METHODS AND SYSTEMS FOR FACILITATING MULTIMEDIA DATA ENCODING USING STORAGE BUFFERS

(71) Applicant: Texas Instruments Incorporated, Dallas, TX (US)

(72) Inventors: Uday Pudipeddi Kiran, Bangalore (IN); Deepak Kumar Poddar, Bangalore (IN); Pramod Kumar Swami, Bangalore (IN); Arun Shankar Kudana, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/089,854

(22) Filed: Apr. 4, 2016

(65) Prior Publication Data

US 2016/0219284 A1 Jul. 28, 2016

Related U.S. Application Data

(63) Continuation of application No. 13/349,268, filed on Jan. 12, 2012, now Pat. No. 9,307,262.

(30) Foreign Application Priority Data

Jan. 13, 2011 (IN) .............................. 118/CHE/2011

(51) Int. Cl.
| | |
|---|---|
| *H04N 11/02* | (2006.01) |
| *H04N 19/423* | (2014.01) |
| *H04N 19/577* | (2014.01) |
| *H04N 19/177* | (2014.01) |
| *H04N 19/44* | (2014.01) |

(52) U.S. Cl.
CPC ......... *H04N 19/423* (2014.11); *H04N 19/177* (2014.11); *H04N 19/44* (2014.11); *H04N 19/577* (2014.11)

(58) Field of Classification Search
CPC ..................................................... H04N 19/423
USPC ........................................ 375/240.01–240.29
See application file for complete search history.

(56) References Cited

U.S. PATENT DOCUMENTS

| | | | | |
|---|---|---|---|---|
| 3,737,640 A | * | 6/1973 | Pao ........................ | G06G 7/161 327/356 |
| 4,634,971 A | * | 1/1987 | Johnson ........... | G01R 19/16561 324/115 |

(Continued)

OTHER PUBLICATIONS

Prosecution History from U.S. Appl. No. 13/349,268, dated Jan. 12, 2012 to Mar. 17, 2016, 356 pages.

*Primary Examiner* — Leron Beck
(74) *Attorney, Agent, or Firm* — Ebby Abraham; Charles A. Brill; Frank D. Cimino

(57) ABSTRACT

Several methods and systems for facilitating multimedia data encoding are disclosed. In an embodiment, a plurality of picture buffers associated with multimedia data are received in an order of capture associated with the plurality of picture buffers. Buffer information is configured for each picture buffer from among the plurality of picture buffers comprising at least one of a metadata associated with the corresponding picture buffer and one or more encoding parameters for the corresponding picture buffer. A provision of picture buffers in an order of encoding is facilitated based on the configured buffer information.

14 Claims, 10 Drawing Sheets

(56) References Cited

U.S. PATENT DOCUMENTS

| | | | | |
|---|---|---|---|---|
| 4,992,868 | A * | 2/1991 | Holtz | H04N 7/015 348/E7.004 |
| 5,416,522 | A * | 5/1995 | Igarashi | H04N 5/145 348/699 |
| 5,668,599 | A * | 9/1997 | Cheney | H04N 5/4401 348/E5.108 |
| 5,764,374 | A * | 6/1998 | Seroussi | H04N 19/593 341/65 |
| 6,031,843 | A * | 2/2000 | Swanbery | H04L 49/10 370/422 |
| 6,104,752 | A * | 8/2000 | Yamagishi | H04N 5/04 348/715 |
| 6,148,140 | A * | 11/2000 | Okada | G11B 27/034 386/241 |
| 6,473,558 | B1 * | 10/2002 | Wu | H04N 5/783 386/290 |
| 6,608,866 | B1 * | 8/2003 | Saunders | H04N 19/159 375/240.16 |
| 6,741,713 | B1 * | 5/2004 | Boone | H04R 25/405 367/119 |
| 6,795,498 | B1 * | 9/2004 | Kato | H04N 19/61 375/240.01 |
| 6,873,735 | B1 * | 3/2005 | Aleksic | H04N 19/89 375/240.2 |
| 6,873,786 | B2 * | 3/2005 | Lin | G11B 27/005 386/206 |
| 7,103,100 | B1 * | 9/2006 | Tsukagoshi | H04N 21/4143 375/240.12 |
| 7,292,602 | B1 * | 11/2007 | Liu et al. | 370/468 |
| 8,135,852 | B2 * | 3/2012 | Nilsson | H04L 29/06 709/230 |
| 8,368,694 | B2 * | 2/2013 | Novosad | G06T 15/06 345/426 |
| 8,482,758 | B2 * | 7/2013 | Onno | H04N 19/63 358/1.15 |
| 2003/0142748 | A1 * | 7/2003 | Tourapis | H04N 19/00684 375/240.13 |
| 2006/0088100 | A1 * | 4/2006 | Han | H04N 19/172 375/240.16 |
| 2006/0209961 | A1 * | 9/2006 | Han | H04N 19/56 375/240.16 |
| 2006/0221418 | A1 * | 10/2006 | Lee | H04N 19/52 358/539 |
| 2007/0183494 | A1 * | 8/2007 | Hannuksela | H04N 21/234327 375/240.1 |
| 2008/0259799 | A1 * | 10/2008 | van Beek | H04L 47/2416 370/235 |
| 2010/0290537 | A1 * | 11/2010 | Moriyoshi | G11B 27/007 375/240.25 |
| 2011/0090960 | A1 * | 4/2011 | Leontaris | H04N 19/103 375/240.12 |
| 2011/0206123 | A1 * | 8/2011 | Panchal | H04N 19/70 375/240.15 |
| 2013/0257916 | A1 * | 10/2013 | Kao et al. | 345/690 |

* cited by examiner

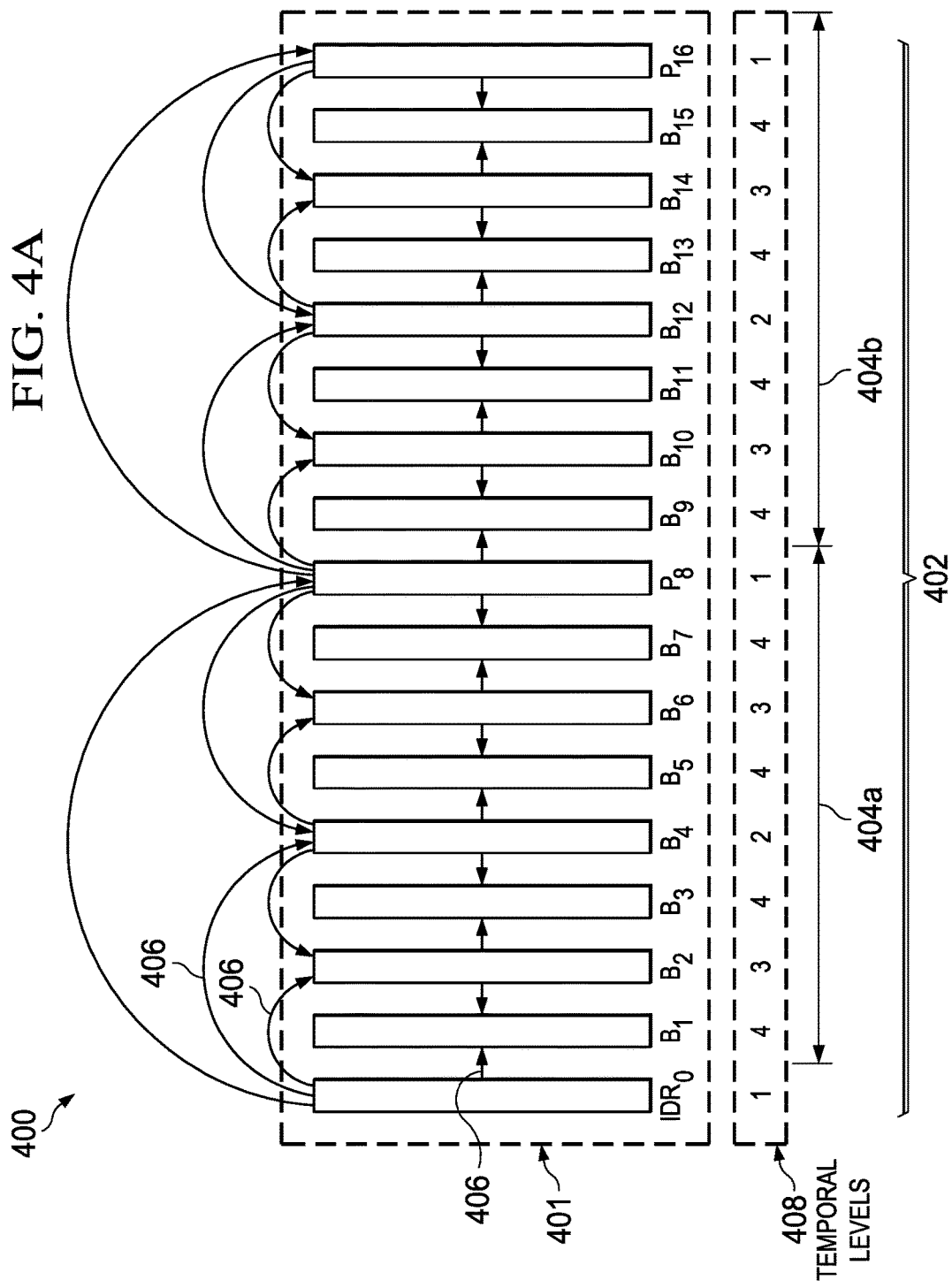

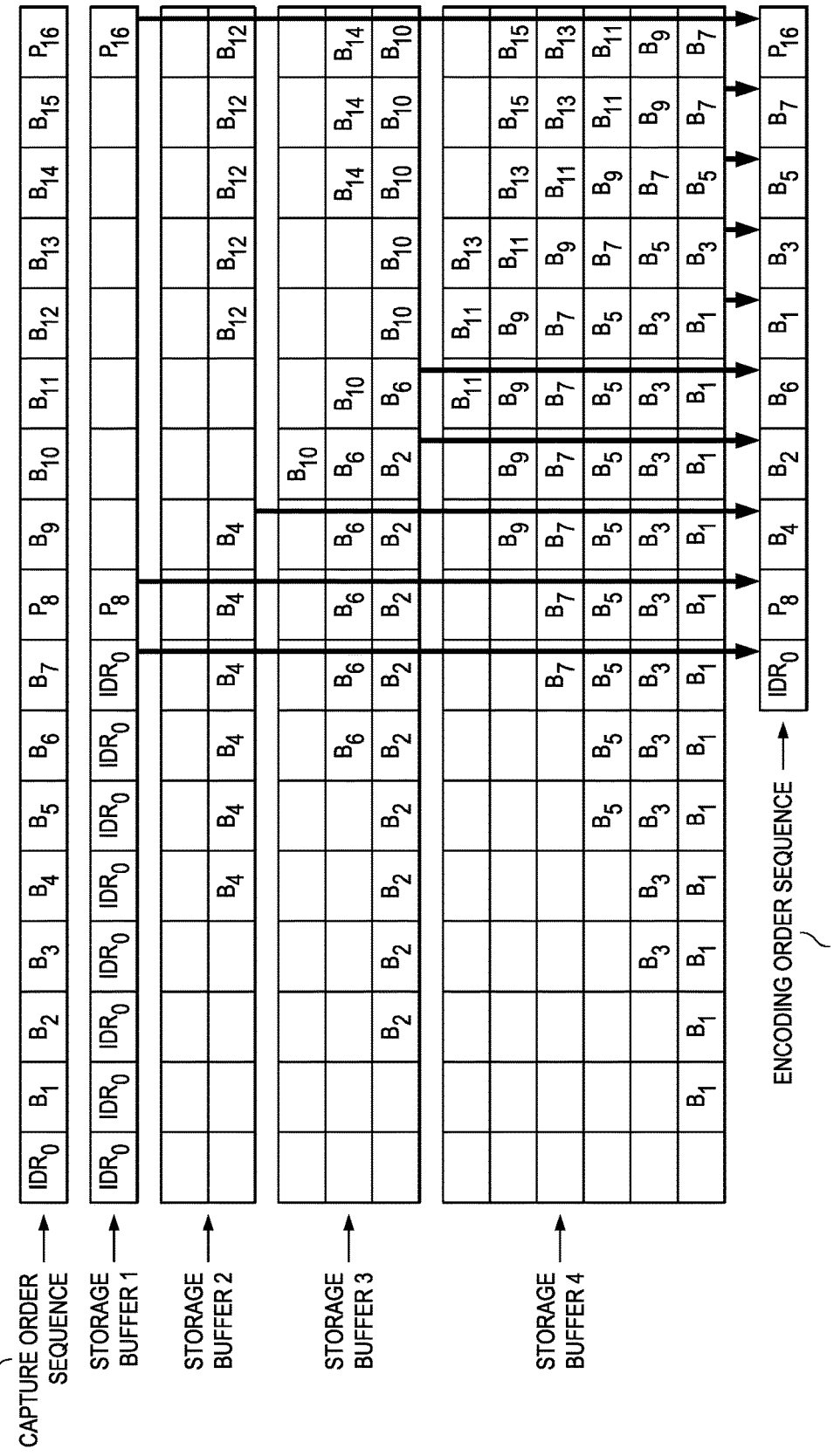

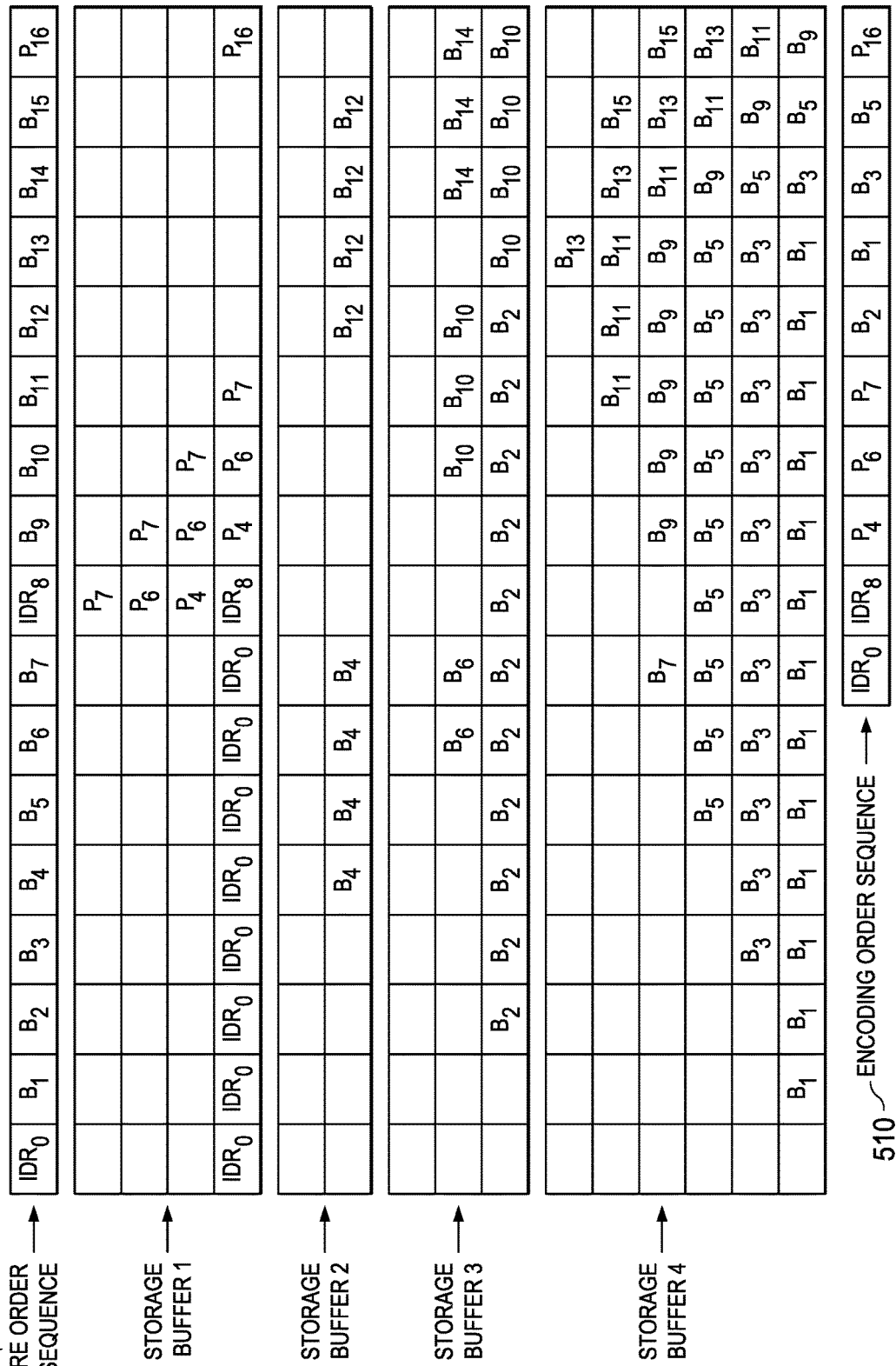

FIG. 6B

| 602 Capture Order Sequence | $P_8$ | $B_9$ | $B_{10}$ | $B_{11}$ | $B_{12}$ | $IDR_{13}$ | $B_{14}$ | $B_{15}$ | $B_{16}$ | $B_{17}$ | $B_{18}$ | $B_{19}$ | $B_{20}$ | $P_{21}$ |
|---|---|---|---|---|---|---|---|---|---|---|---|---|---|---|
| Storage Buffer 1 | $P_8$ | | | | | $IDR_{13}$ | $IDR_{13}$ | $IDR_{13}$ | $P_{12}$ | | | | | $P_{21}$ |
| | | | | | | | | $P_{12}$ | | | | | | |
| | | | | | | | $P_{12}$ | | | | | | | |
| | | | | | | $P_{12}$ | | | | | | | | |
| Storage Buffer 2 | $B_4$ | $B_4$ | | $B_{12}$ | $B_{12}$ | | | | | $B_{17}$ | $B_{17}$ | $B_{17}$ | $B_{17}$ | |
| Storage Buffer 3 | $B_6$ | $B_6$ | $B_{10}$ | | | | | | | | | | | |
| | $B_2$ | $B_2$ | $B_6$ | $B_{10}$ | $B_{10}$ | $B_{10}$ | $B_{10}$ | $B_{10}$ | $B_{10}$ | | | $B_{19}$ | $B_{19}$ | |
| | | | $B_2$ | $B_6$ | | | | | | | | | | |
| Storage Buffer 4 | $B_7$ | $B_9$ | $B_{11}$ | $B_{11}$ | | | $B_{14}$ | $B_{15}$ | | | | | | |
| | $B_5$ | $B_7$ | $B_9$ | $B_9$ | | | $B_{11}$ | $B_{13}$ | $B_{13}$ | $B_{13}$ | $B_{13}$ | $B_{13}$ | $B_{13}$ | $B_{13}$ |
| | $B_3$ | $B_5$ | $B_7$ | $B_7$ | | | $B_9$ | $B_{11}$ | $B_{11}$ | $B_{11}$ | $B_{11}$ | $B_{11}$ | $B_{11}$ | $B_{11}$ |
| | $B_1$ | $B_3$ | $B_5$ | $B_5$ | | | $B_7$ | $B_9$ | $B_9$ | $B_9$ | $B_9$ | $B_9$ | $B_9$ | $B_9$ |
| | | $B_1$ | $B_3$ | $B_3$ | | | $B_5$ | $B_7$ | | | | | | |
| | | | $B_1$ | $B_1$ | | | $B_3$ | | | | | | | |
| | | | | | | | $B_1$ | | | | | | | |
| | | | | | | | | $B_{15}$ | $B_{15}$ | $B_{15}$ | $B_{15}$ | $B_{15}$ | $B_{15}$ | $B_{15}$ |
| 608 Encoding Order Sequence | $P_8$ | $B_4$ | $B_2$ | $B_6$ | $B_1$ | $B_3$ | $B_5$ | $B_7$ | $P_{12}$ | $B_{10}$ | $B_9$ | $B_{11}$ | $IDR_{13}$ | $P_{21}$ |

METHODS AND SYSTEMS FOR FACILITATING MULTIMEDIA DATA ENCODING USING STORAGE BUFFERS

CROSS-REFERENCE TO RELATED APPLICATIONS

This application is a continuation of U.S. patent application Ser. No. 13/349,268 filed Jan. 12, 2012 which claims the benefit of India Provisional Patent Application Serial No. 118/CHE/2011, filed Jan. 13, 2011, both of which are incorporated herein by reference in their entirety.

TECHNICAL FIELD

The present disclosure generally relates to the field of multimedia data encoding.

BACKGROUND

Pursuant to an exemplary scenario, during encoding of multimedia frames such as bi-directional coded frames (B-frames), a temporal prediction of each B-frame is performed bi-directionally by referring to one or more reference frames temporally preceding the B-frame and one or more reference frames temporally succeeding the B-frame in an order of capture of the multimedia frames. In the above-described scenario, the temporally succeeding multimedia frames are encoded prior to encoding the B-frame so as to render the temporally succeeding multimedia frames available during the encoding of the B frame. However, multimedia capture devices output the captured multimedia frames as buffers in the order that the multimedia frames are captured, which is different from an order of encoding the multimedia frames.

SUMMARY

Various methods and systems for facilitating multimedia data encoding are disclosed. In an embodiment, a method includes receiving a plurality of picture buffers associated with multimedia data in an order of capture associated with the plurality of picture buffers. The multimedia data may comprise multimedia frames, such as intra-coded frames (I-frames), predictive-coded frames (P-frames) and/or bi-directional coded frames (B-frames). The method also includes configuring buffer information. In an embodiment, the buffer information comprises at least one of a metadata associated with the corresponding picture buffer and one or more encoding parameters for the corresponding picture buffer. The method also includes facilitating a provision of picture buffers in an order of encoding based on the configured buffer information.

In an embodiment, facilitating the provision of picture buffers in an order of encoding includes identifying a temporal level from among a plurality of pre-determined temporal levels. The temporal level is identified for each picture buffer based on the buffer information configured for each picture buffer. Facilitating a provision of picture buffers in an order of encoding further includes storing the buffer information configured for each picture buffer in a storage buffer from among a plurality of storage buffers. The buffer information is stored based on the temporal level of each picture buffer and a temporal level associated with each storage buffer.

In an embodiment, the buffer information configured for a picture buffer corresponding to one of an I-frame, an instantaneous decoding refresh (IDR) frame, and a P-frame is stored in a storage buffer from among the plurality of storage buffers associated with lowest temporal level of the plurality of pre-determined temporal levels. The buffer information configured for a picture buffer corresponding to a B-frame or a P-frame is stored in a storage buffer from among the plurality of buffers associated with higher temporal levels than the lowest temporal level of the plurality of pre-determined temporal levels. In an embodiment, facilitating a provision of picture buffers in an order of encoding further includes retrieving the buffer information configured for the picture buffers in the order of encoding from the plurality of storage buffers upon completion of storing buffer information corresponding to picture buffers associated with a pre-determined group of pictures (GOP).

In an embodiment, a storage buffer from among the plurality of storage buffers including at least one buffer information corresponding to picture buffers associated with the GOP is identified such that the identified storage buffer is associated with a lowest temporal level from among the temporal levels associated with the plurality of storage buffers including the buffer information. In an embodiment, the lowest temporal level is higher than a temporal level associated with a previously identified storage buffer as the identification is performed starting from a storage buffer associated with the lowest temporal level to a storage buffer associated with a highest temporal level of the pre-determined temporal levels. In an embodiment, the buffer information from the identified storage buffer is retrieved, such that the buffer information corresponds to one of an earliest of the stored buffer information and a latest of the stored buffer information in the identified storage buffer. Moreover, an encoding of the picture buffers is initiated based on the retrieved buffer information in the order of encoding. The encoded picture buffers are rendered available as reference picture buffers for an encoding of subsequent picture buffers. Retrieving the buffer information in the order of encoding and rendering the encoded picture buffers available as reference picture buffers for encoding of subsequent picture buffers facilitates continuous encoding of picture buffers upon initiation of encoding.

Additionally in an embodiment, a system for facilitating multimedia data encoding is provided. The system includes a buffer information module, a memory module, and a processor module. The buffer information module is configured to receive a plurality of picture buffers associated with multimedia data, wherein the plurality of picture buffers are received in an order of capture associated with the plurality of picture buffers. The buffer information module is also configured to configure buffer information comprising at least one of metadata associated with the picture buffer and at least one encoding parameter for each picture buffer from among the plurality of picture buffers. The memory module is configured to identify a temporal level from among a plurality of pre-determined temporal levels for each picture buffer from among the plurality of picture buffers based on the buffer information configured for each picture buffer and store buffer information configured for each picture buffer based on the temporal level of each picture buffer. The processor module is configured to retrieve buffer information configured for the picture buffers in the order of encoding from the memory module upon completion of storing of buffer information corresponding to picture buffers associated with a pre-determined group of pictures (GOP).

Moreover, in an embodiment, a computer-readable medium storing a set of instructions that when executed cause a computer to perform a method for facilitating multimedia data encoding is provided. The method includes receiving a plurality of picture buffers associated with multimedia data, the plurality of picture buffers are being received in an order of capture associated with the plurality of picture buffers. The method also includes configuring buffer information comprising at least one of metadata associated with the picture buffer and at least one encoding parameter for each picture buffer from among the plurality of picture buffers. The method further includes facilitating a provision of picture buffers in an order of encoding based on the buffer information configured for each picture buffer from among the plurality of picture buffers.

BRIEF DESCRIPTION OF THE FIGURES

FIGS. 4A and 4B illustrate a retrieving of the buffer information configured for a plurality of picture buffers from the plurality of storage buffers in an order of encoding according to an embodiment;

FIGS. 5A and 5B illustrate a retrieving of the buffer information in an order of encoding upon receiving a instantaneous decoding refresh (IDR) frame insertion request in a group of pictures (GOP) structure according to an embodiment;

FIGS. 6A and 6B illustrate a retrieving of the buffer information in an order of encoding upon receiving a IDR frame insertion request in the GOP structure according to another embodiment;

DETAILED DESCRIPTION

Pursuant to an exemplary scenario, during multimedia encoding, an order of encoding multimedia frames is different from an order of capturing the multimedia frames, especially when the multimedia frames include for example, B-frames, P-frames, and the like. Various embodiments of the present technology, however, provide methods and systems for facilitating multimedia data encoding by providing multimedia frames in an order of encoding prior to subjecting the multimedia frames to encoding.

The following description and accompanying figures demonstrate that the present technology may be practiced or otherwise implemented in a variety of different embodiments. It should be noted, however, that the scope of the present technology is not limited to any or all of the embodiments disclosed herein. Indeed, one or more of the devices, features, operations, processes, characteristics, or other qualities of a disclosed embodiment may be removed, replaced, supplemented, or changed.

Figure 1:
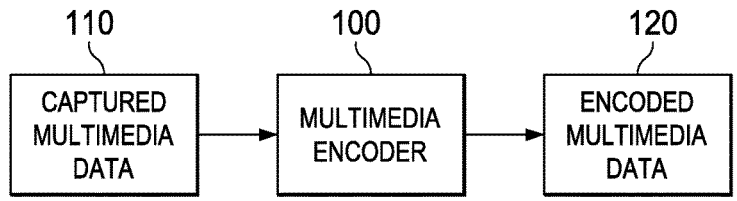
FIG. 1 illustrates a simplified overview of encoding multimedia data in accordance with an exemplary scenario.

FIG. 1 illustrates a simplified overview of encoding multimedia data in accordance with an exemplary scenario. In particular, a multimedia encoder 100 receives captured multimedia data 110 and outputs encoded multimedia data 120. An example of multimedia data may include, but is not limited to, video data captured by video capture device. Examples of a video capture device may include a video camera or a camcorder. The video capture device may be, for example, a stand-alone device or a part of a mobile device, such as a Smartphone, or a data processing device such as a personal computer, a laptop device or a personal digital assistant (PDA). In an exemplary embodiment, the multimedia encoder 100 may be configured within a personal computer (PC), a tablet PC, a PDA, a mobile communication device, a web appliance, a set-top box (STB), an embedded system and/or any machine capable of executing a set of instructions (sequential and/or otherwise) so as to perform an encoding of multimedia data.

In an embodiment, the multimedia encoder 100 is programmed to comply with a video compression standard. Examples of the video compression standards include, but are not limited to, video coding experts group (VCEG), H.120, H.261, moving pictures experts group (MPEG), MPEG-1 Part 2, H.262 or MPEG-2 Part 2, H.263, MPEG-4 Part 2, H.264 or MPEG-4 AVC, VC-2 (Dirac), high efficiency video coding (HEVC), and the like.

The multimedia data may comprise multimedia frames, such as intra-coded frames (I-frames), predictive-coded frames (P-frames) and/or bi-directional coded frames (B-frames). The multimedia frames may be captured by a multimedia capture device (for example, the video capture device) and provided to a multimedia encoder 100 in the form of picture buffers. Pursuant to one embodiment, however, the multimedia frames captured by the multimedia capture device may be stored in a memory device (e.g., a temporary storage such as flash memory) in the form of picture buffers and subsequently provided to the multimedia encoder 100. The multimedia encoder 100 may encode the picture buffers and output the encoded picture buffers for subsequent processing purposes. An example of the multimedia encoder 100 may include a video encoder.

In accordance with an embodiment, from among the picture buffers, picture buffers corresponding to the I-frames may be encoded based on information present within the picture buffer themselves and do not require any reference frame information for encoding purposes. The picture buffers corresponding to the P-frames may be encoded based on reference frame information from picture buffers temporally preceding the respective P-frames in an order of capture of the picture buffers. The picture buffers corresponding to the B-frames may be encoded based on reference frame information from picture buffers temporally preceding and/or succeeding the respective B-frames in the order of capture of the picture buffers. Therefore, it is essential to encode the temporally succeeding picture buffers prior to encoding a picture buffer corresponding to a B-frame so as to render the reference frame information available during the encoding of the B frame. However, multimedia capture devices output the captured multimedia frames as picture buffers in the order of capture of the multimedia frames, which may be different from an order of encoding of the picture buffers. If the picture buffers are subjected to the encoding in the order of capture, the temporally succeeding picture buffers are rendered unavailable during the encoding of a B-frame or a P-frame from among the multimedia frames, which may cause a delay during encoding.

Since an order of encoding of picture buffers may be different from an order of capture of the picture buffers (when the picture buffers correspond to, for example, B-frames or P-frames), the picture buffers may be ordered in the order of encoding prior to the encoding and/or prior to the provision of the picture buffers to the multimedia encoder 100. An exemplary system capable of ordering the multimedia frames in the order of encoding prior to encoding of the multimedia frames is explained in FIG. 2.

Figure 2:
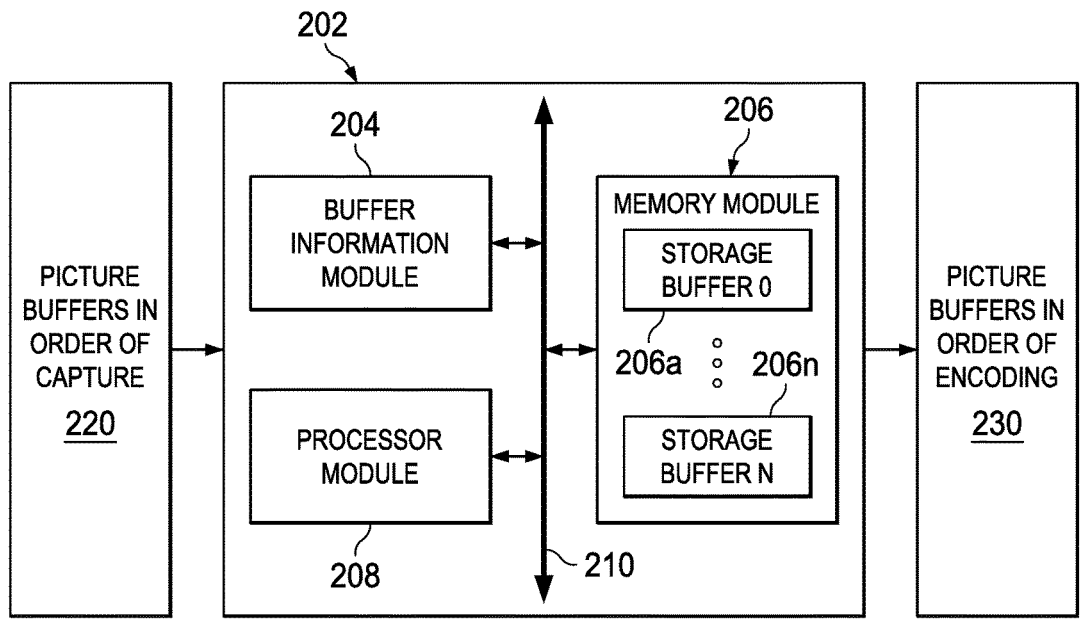
FIG. 2 is a block diagram of a system for facilitating multimedia data encoding according to an embodiment.

FIG. 2 is a block diagram of a system 202 for facilitating multimedia data encoding according to an embodiment. The system 202 receives picture buffers in order of capture 220 and outputs picture buffers in order of encoding 230. In particular, system 202 is configured to arrange the picture buffers (corresponding to the multimedia frames) in the order of encoding prior to encoding the picture buffers. In an embodiment, the system 202 is configured to be communicatively coupled or associated with a multimedia encoder, such as the multimedia encoder 100 of FIG. 1, so as to provide the multimedia frames in the order of encoding to the multimedia encoder 100. In an embodiment, the system 202 is configured to be included in the multimedia encoder 100 and order the multimedia frames in the order of encoding prior to encoding the multimedia frames.

In an embodiment, the system 202 is an exemplary form of a computer system within which sets of instructions (for example, instructions for causing system 202 to perform one or more of the methodologies discussed herein) are executed. In various embodiments, the system 202 operates as a standalone device and/or is communicatively associated with, coupled with or connected to (e.g., networked with) other systems, including, for example, the multimedia encoder 100, which is configured to encode the multimedia data. An example of the system 202 may include, but is not limited to, an embedded system and/or any machine capable of executing a set of instructions (sequential and/or otherwise) configured to cause one and/or more of the methodologies discussed herein to be performed.

The system 202 includes a buffer information module 204, a memory module 206, and a processor module 208. In an embodiment, the buffer information module 204, the memory module 206, and the processor module 208 are configured to communicate with each other via a bus 210. Examples of the bus 210 include, but are not limited to, a data bus, an address bus, a control bus, and the like. The bus 210 may be, for example, a serial bus, a bi-directional bus or a unidirectional bus.

In an embodiment, the buffer information module 204 may be configured to receive a plurality of picture buffers associated with multimedia data. In an embodiment, the plurality of picture buffers are received in an order of capture associated with the plurality of picture buffers as explained in FIG. 1. The picture buffers may correspond to multimedia frames of the multimedia data and may be received by the buffer information module 204 from one of a multimedia capture device (for example, a video camera) and a temporary memory configured to store the picture buffers received from the multimedia capture device. Examples of the temporary memory may include, but are not limited to, random access memory (RAM), read only memory (ROM), synchronous dynamic RAM (SDRAM) and double data rate SDRAM (DDR SDRAM).

In an embodiment, the captured multimedia frames may be grouped into one or more group of pictures (GOPs). In an embodiment, a GOP may include multimedia frames from one key frame, such as an I-frame, a P-frame or an instantaneous decoding refresh (IDR) frame, to another key frame. For example, if a sequence of captured multimedia frames is IBBBPBBBBI, then a first GOP may include multimedia frames from the I-frame in the beginning of the sequence to the P-frame, and therefore includes multimedia frames in the sequence BBBP. Similarly, the second GOP may include multimedia frames from the P-frame to the I-frame located at the end of the sequence of multimedia frames, and therefore includes multimedia frames in the sequence BBBBI. A GOP structure may be configured to include one or more multimedia frames in the order of capture. Accordingly, in the exemplary sequence of captured multimedia frames of IBBBPBBBBI, the GOP structure may include multimedia frames in the sequence IBBBPBBBBI. Such a GOP structure may include, for example, the first GOP and the second GOP. In an embodiment, each captured multimedia frame may be associated with a current GOP number indicating a GOP to which the captured multimedia frame belongs.

In an embodiment, the buffer information module 204 is further capable of configuring buffer information for each picture buffer from among the plurality of picture buffers. In an embodiment, the buffer information comprises at least one of a metadata associated with the corresponding picture buffer and one or more encoding parameters for the corresponding picture buffer. For example, for a picture buffer 1, the configured buffer information includes metadata associated with the picture buffer 1 and one or more encoding parameters for the picture buffer 1. The buffer information may be configured for each picture buffer of the plurality of picture buffers. In an embodiment, the buffer information comprises metadata associated with the plurality of picture buffers and/or the multimedia data. Examples of the metadata associated with the plurality of picture buffers and/or the multimedia data, include, but are not limited to, information associated with a buffer address of each picture buffer, multimedia frame type (e.g., I-frames, P-frames, B-frames, and the like), a current GOP number indicative of a GOP to which a buffered multimedia frame belongs, a capture index of the multimedia frame, a buffer pointer of a scaling matrix to be used for the multimedia frame, and the like. The term 'capture index' as used herein may be construed as a numerical data indicating an order of capture of the multimedia frames. For example, a multimedia frame captured first will include a capture index of 1 and another multimedia frame captured next to the multimedia frame will include a capture index 2. Examples of the encoding parameter include, but are not limited to, one or more scaling matrices to be used for the multimedia frames, coordinates of the region of interest for encoding, and the like. The term 'scaling matrix' as used herein may be construed as a matrix used for subjective quality improvement for encoding purposes. An example of the scaling matrix includes, but is not limited to a quantisation scaling matrix. The term 'region of interest' as used herein may be construed as a region within a picture acquisition or display area relevant from an encoding perspective.

The buffer information for the plurality of picture buffers may be stored in the memory module 206. In an embodiment, memory module 206 comprises a plurality of storage buffers, such as storage buffers 206a-206n, which are configured to store the buffer information configured for the plurality of picture buffers. Examples of the storage buffers include, but are not limited to, a first in first out (FIFO) buffer, a last in first out (LIFO) buffer, and the like.

In an embodiment, the memory module 206 is configured to determine a temporal level for each picture buffer based on the buffer information associated with each picture buffer prior to storing the picture buffers in the plurality of storage buffers. The term 'temporal level' as used herein may be construed as a relative measure of dependence in encoding of a picture buffer on other picture buffers. Accordingly, the higher a temporal level associated with a picture buffer, the more dependent the picture buffer is on other picture buffers for encoding purposes and the picture buffer is less likely to be referred by other picture buffers for encoding purposes. For example, the key frames, such as an I-frame, a P-frame or an IDR-frame, are relatively less dependent on other multimedia frames (or relatively independent) than B-frames, and, accordingly, the corresponding picture buffers may be associated with the lower temporal level. In an embodiment, all the B-frames may not have the same measure of dependence on other frames. For example, some B-frames may refer to x frames in temporally succeeding order of capture and y frames in temporally preceding order of capture, while some B-frames may refer to 'x-1' frames in a temporally succeeding order of capture and 'y-1' frames in a temporally preceding order of capture. Accordingly, based on a higher or lower measure of dependency, the corresponding picture buffers may be associated with higher or lower temporal levels. In an embodiment, a GOP structure may include a plurality of temporal levels.

In an embodiment, each storage buffer from among a plurality of storage buffers may also be associated with a temporal level of a plurality of pre-determined temporal levels. The pre-determined temporal levels may correspond to a number of temporal levels in the GOP structure. In an exemplary embodiment, the pre-determined number of temporal levels is three. Accordingly, three storage buffers each associated with a temporal level may be allocated within the memory module 206 so as to store the buffer information configured for the plurality of picture buffers.

In an embodiment, a temporal level of a picture buffer may be matched with a temporal level of a storage buffer, and, upon confirmation of a match, the buffer information corresponding to the picture buffer may be stored in the respective storage buffer. In an embodiment, the memory module 206 may store buffer information associated with a key frame (e.g., I-frame, IDR frame or P-frame) in a storage buffer associated with a lowest temporal level, and may store buffer information associated with a multi-reference frame, such as a B-frame or a P-frame, in a storage buffer associated with a higher temporal level than the lowest temporal level of the plurality of pre-determined temporal levels. The storing of the buffer information is further explained in FIG. 3.

Figure 3:
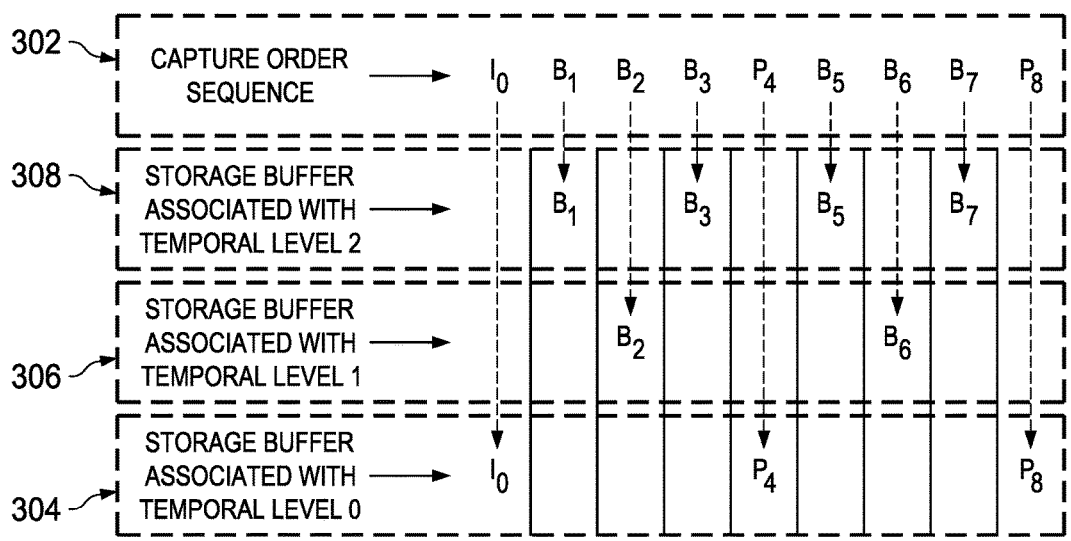
FIG. 3 illustrates a storing of buffer information associated with captured multimedia data in a plurality of storage buffers according to an embodiment.

Referring now to FIG. 3, a storing of buffer information in the storage buffers is illustrated according to an embodiment. As explained in FIG. 2, each of a picture buffer and a storage buffer may be associated with a temporal level. In an embodiment, information regarding a temporal level in the buffer information configured for each picture buffer may be matched with the temporal levels associated with the storage buffers and upon confirmation of a match, and the buffer information may be stored in the matching storage buffer.

FIG. 3 depicts an exemplary capture order sequence 302 of multimedia frames as $I_0$, $B_1$, $B_2$, $B_3$, $P_4$, $B_5$, $B_6$, $B_7$ and $P_8$. Buffer information may be configured for a picture buffer corresponding to each multimedia frame in the capture order sequence 302 of the multimedia frames. Information regarding the temporal level associated with each picture buffer may be included in the buffer information configured for each picture buffer. FIG. 3 further depicts three storage buffers 304, 306, and 308 associated with temporal levels, such as temporal level 0, temporal level 1 and temporal level 2. A temporal level of a picture buffer included in the corresponding buffer information may be matched with a temporal level of a storage buffer (e.g. 304, 306, or 308), and upon confirmation of a match, the buffer information corresponding to the picture buffer may be stored in the respective storage buffer. In FIG. 3, the captured multimedia frames are depicted to be stored in the storage buffers, however, it should be noted that buffer information configured for picture buffers corresponding to these multimedia frames may be stored in the storage buffer.

The key frames $I_0$, $P_4$, and $P_8$ are depicted to be stored in a storage buffer associated with a lowest temporal level (e.g., temporal level 0), thereby implying a relative independence of these multimedia frames on other frames for encoding purposes. The frames $B_2$ and $B_6$ are stored in a storage buffer associated with temporal level 1, thereby implying comparatively more dependence of these multimedia frames on other frames for encoding purposes as compared to key frames, but lesser than the frames $B_1$, $B_3$, $B_5$ and $B_7$ depicted to be stored in storage buffer associated with temporal level 2.

It should be noted that, in accordance with an embodiment, storing of the buffer information configured for the plurality of picture buffers based on the temporal level classifies the buffer information into different categories, and, depending upon an available bandwidth for encoding/storing, buffer information stored in one or more storage buffers may be expelled without affecting a syntax for decoding, thereby avoiding degradation in a quality of the multimedia data. For example, if one or more multimedia frames in the storage buffer associated with the highest temporal level (for example, temporal level 2) are dropped, as they are the most dependent on other multimedia frames for encoding and are the least referred (as no other multimedia frames refer to them), a frame rate associated with the multimedia frames during decoding is reduced from, for example, 60 frames per second (fps) to for example, 30 fps, and, hence, the multimedia frames can be dropped without affecting the decoding syntax. In accordance with one embodiment, however, if the multimedia frames in the storage buffers associated with a lower temporal level (for example, temporal level 1) are dropped, the frame rate associated with the multimedia frames during decoding is reduced from 60 fps to 15 fps, as the multimedia frames in the storage buffers associated with the lower temporal levels are most referred during the encoding of other multimedia frames and, hence, are not dropped without affecting the decoding syntax.

Referring back to FIG. 2, in an embodiment, the processor module 208 is configured to retrieve buffer information configured for the picture buffers in the order of encoding from the memory module 206 upon completion of the storing of buffer information corresponding to picture buffers associated with a pre-determined group of pictures (GOP). For example, in an $I_1B_2B_3P_4B_5B_6I_7$ GOP structure, upon completion of the storing of buffer information associated with a first GOP including $I_1$, $B_2$, $B_3$, and $P_4$ frames, the buffer information associated with the first GOP is lined up for encoding by retrieving the buffer information from the plurality of buffers in the order of encoding. When the buffer information associated with the first GOP is lined up for encoding, the buffer information associated with a second GOP (including $B_5$, $B_6$, and $I_7$ frames) is simultaneously stored in the plurality of storage buffers.

In an embodiment, the processor module 208 is further configured to identify a storage buffer from among the plurality of storage buffers including at least one buffer information corresponding to picture buffers associated with the GOP, where the identified storage buffer is associated with a lowest temporal level from among the temporal levels associated with the plurality of storage buffers including the buffer information. The lowest temporal level may be higher than a temporal level associated with a previously identified storage buffer for the GOP. In an embodiment, buffer information may be retrieved from the identified storage buffer, wherein the buffer information corresponds to one of an earliest of the stored buffer information and a latest of the stored buffer information in the identified storage buffer. In an embodiment, the processor module 208 may perform the identification and the retrieval repeatedly in a cyclic manner starting from a storage buffer associated with the lowest temporal level of the temporal levels to a storage buffer associated with a highest temporal level of the pre-determined temporal levels for retrieving the buffer information associated with the plurality of picture buffers in the order of encoding. The identification and the retrieval of the picture buffers in the order of encoding is explained in detail in FIGS. 4A-4B. In an embodiment, an encoding of the picture buffers may be initiated, for example, by multimedia encoder 100 based on the retrieved buffer information in the order of encoding. In an embodiment, the encoded picture buffers may be rendered available as reference picture buffers for the encoding of subsequent picture buffers for facilitating a continuous encoding of picture buffers upon initiation of encoding.

In an embodiment, an IDR frame insertion request corresponding to a picture buffer of the plurality of picture buffers is received. The term 'IDR frame' as used herein may be construed as an I-frame that forces all previously decoded multimedia frames, that are still in use as reference frames, to no longer be used as reference frames upon decoding of the IDR frame. When encoding is performed using the IDR frame the multimedia encoder, for example multimedia encoder 100 resets and empties the reference frames previously stored in a decoded picture buffer, and encodes multimedia flames following the IDR flame with reference to only flames following the IDR flame.

Upon receiving the IDR frame insertion request, the buffer information module 204 converts the buffer information associated with the picture buffer into the buffer information corresponding to the IDR frame. For example, if an IDR frame insertion request is received at B-frame with a capture index 8 (for example, $B_8$) in a GOP, the B-frame is converted into an IDR frame with a capture index 8 (for example, $IDR_8$). Subsequent to the conversion, the buffer information module 204 selects one or more picture buffers corresponding to B-frames preceding the picture buffer in the order of capture and corresponding to a GOP associated with the picture buffer. In an embodiment, each of the selected one or more picture buffers comprise at least one of an associated temporal level that is different than a temporal level associated with the picture buffer at which the IDR frame insertion request is received and an associated capture index that is higher than a capture index of a previously selected picture buffer corresponding to the B-frame within the GOP.

In an embodiment the buffer information configured for the selected one or more picture buffers from among the buffer information corresponding to the B-frames is converted into buffer information corresponding to P-frames. In an embodiment, in order to perform the conversion, the buffer information module 204 extracts the buffer information from the selected one or more picture buffers from one of the plurality of storage buffers, modifies the extracted buffer information from buffer information corresponding to the B-frames into buffer information corresponding to the P-frames, and transfers the modified buffer information corresponding to the P-frames into a storage buffer associated with the lowest temporal level from among the temporal levels associated with the plurality of storage buffers.

In an embodiment, selection of the one or more picture buffers corresponding to the B-frames from a storage buffer associated with the lowest temporal level to a storage buffer associated with the highest temporal level from among the plurality of storage buffers is performed repeatedly.

In an embodiment, a flush request corresponding to a picture buffer (for example, a missing picture buffer) from among the plurality of picture buffers is received. In an embodiment, the buffer information module 204 selects one or more picture buffers corresponding to B-frames preceding the picture buffer for which the flush request is received in the order of capture and corresponding to a GOP associated with the picture buffer. In an embodiment, each of the selected one or more picture buffers comprise at least one of an associated temporal level different than a temporal level associated with the picture buffer at which the flush request is received, and an associated capture index higher than a capture index of a previously selected picture buffer corresponding to the B-frame within the GOP.

In an embodiment, the buffer information configured for the selected one or more picture buffers from buffer information corresponding to the B-frames is converted into buffer information corresponding to P-frames. In an embodiment, in order to perform the conversion, the buffer information module 204 extracts the buffer information from the selected one or more picture buffers from one of the plurality of storage buffers, modifies the extracted buffer information from buffer information corresponding to the B-frames into buffer information corresponding to the P-frames, and transfers the modified buffer information corresponding to the P-frames into a storage buffer associated with a lowest temporal level from among the temporal levels associated with the plurality of storage buffers. In an embodiment, selection of the one or more picture buffers corresponding to the B-frames from a storage buffer associated with a lowest temporal level to a storage buffer associated with the highest temporal level from among the plurality of storage buffers is performed repeatedly.

In an embodiment, the system 202 and/or multimedia encoder 100 may be a part of a system including other components (not shown in FIGS. 1 and 2), such as, for example, an input unit (e.g., a multimedia processing device), a video display unit (e.g., a liquid crystals display (LCD), a cathode ray tube (CRT), and the like), a cursor control device (e.g., a mouse), a drive unit (e.g., a disk drive), a signal generation unit (e.g., a speaker) and/or a network interface unit. The input unit is operable to transfer multimedia data from a memory to the buffer information module 204 and the processor module 208 so as to facilitate an encoding of multimedia data. The drive unit includes a machine-readable medium upon which is stored one or more sets of instructions (e.g., software) embodying one or more of the methodologies and/or functions described herein. In an embodiment, the software resides, either completely or partially, within the memory module 206 and/or the processor module 208 and/or within the multimedia encoder 100 during the execution thereof by the system 202 such that the processor module 208, the multimedia encoder 100 and/or the memory module 206 also constitute machine-readable media.

The software may further be transmitted and/or received over a network via the network interface unit. The term "machine-readable medium" may be construed to include a single medium and/or multiple media (e.g., a centralized and/or distributed database, and/or associated caches and servers) that store the one or more sets of instructions. Moreover, the term "machine-readable medium" may be construed to include any medium that is capable of storing, encoding and/or carrying a set of instructions for execution by the system 202 and that cause the system 202 to perform one or more of the methodologies of the various embodiments. Furthermore, the term "machine-readable medium" may be construed to include, but shall not be limited to, solid-state memories, optical and magnetic media, and carrier wave signals.

FIGS. 4A and 4B illustrate a retrieving of the buffer information configured for a plurality of picture buffers from the plurality of storage buffers in an order of encoding according to an embodiment. FIG. 4A depicts a GOP structure 400 and a plurality of picture buffers 401 associated with the GOP structure 400 in a capture order sequence 402. The GOP structure 400 includes first GOP 404a, which includes picture buffers corresponding to multimedia frames $B_1$, $B_2$, $B_3$, $B_4$, $B_5$, $B_6$, $B_7$, and Pg, and a second GOP 404b, which includes picture buffers corresponding to the multimedia frames $B_9$, $B_{10}$, $B_{11}$, $B_{12}$, $B_{13}$, $B_{14}$, $B_{15}$, and $P_{16}$. The arrows, such as arrows 406, depicted in FIG. 4A illustrate a dependence of a picture buffer on other picture buffers as reference frames for encoding purposes. For example, the picture buffer corresponding to the multimedia frame $B_3$ references the picture buffers corresponding to the multimedia frames $B_2$ and $B_4$, and the picture buffer corresponding to the multimedia frame $B_4$ references the picture buffers corresponding to the multimedia frames $B_2$ and $B_6$, for encoding purposes. Temporal levels 408 associated with the respective picture buffers are also depicted in FIG. 4A. For example, picture buffers corresponding to the multimedia frames $B_1$, $B_3$, $B_5$, $B_7$, $B_9$, $B_{11}$, $B_{13}$, and $B_{15}$ are associated with temporal level 4, picture buffers corresponding to the multimedia frames $B_2$, $B_6$, $B_{10}$, and $B_{14}$ are associated with temporal level 3, picture buffers corresponding to the multimedia frames $B_4$ and $B_{12}$ are associated with temporal level 2, and the picture buffers corresponding to the multimedia frames $IDR_0$, $P_8$ and $P_{16}$ are associated with temporal level 1. The storage of the buffer information corresponding to the first GOP 404a and second GOP 404b in the plurality of storage buffers and their subsequent retrieval in the order of encoding is explained in FIG. 4B.

FIG. 4B illustrates storage of the buffer information corresponding to the capture order sequence 402 of FIG. 4A and their subsequent retrieval from the plurality of storage buffers according to an embodiment. The buffer information corresponding to the picture buffers in the capture order sequence 402 are received in the same order by the buffer information module 204 as depicted by the capture order sequence 402 in FIG. 4A. As explained earlier in FIG. 2, each storage buffer from among the plurality of storage buffers is associated with a temporal level from among the plurality of pre-determined temporal levels. In FIG. 4, four storage buffers are depicted with each storage buffer associated with a temporal level (corresponding to one of the four temporal levels associated with a plurality of picture buffers corresponding to the capture order sequence 402). For example, storage buffer 1 is associated with temporal level 1 (e.g., a lowest temporal level), storage buffer 2 is associated with temporal level 2, storage buffer 3 is associated with temporal level 3 and storage buffer 4 is associated with temporal level 4.

Also, as explained in FIG. 2, a temporal level of a picture buffer may be matched with a temporal level of a storage buffer, and, upon confirmation of a match, the buffer information corresponding to the picture buffer may be stored in the respective storage buffer. Accordingly, when buffer information is received from the buffer information module 204 in the capture order sequence 402, one-after-another, a temporal level associated with the picture buffer is matched with the temporal level associated with the storage buffer and the corresponding buffer information is stored in the respective picture buffers. For example, picture buffer $IDR_0$ is associated with temporal level 1, and, accordingly, the corresponding buffer information is stored in storage buffer 1. Subsequently, when picture buffer $B_1$ associated with temporal level 4 is received, the corresponding buffer information is stored in storage buffer 4.

Upon completion of the storing of the buffer information for picture buffers corresponding to the first GOP 404a (for example, upon the storing of buffer information corresponding to picture buffer $P_8$), the processor module 208 may identify a lowest temporal level storage buffer from among the plurality of storage buffers including at least one buffer information corresponding to picture buffers associated with the first GOP 404a and retrieve buffer information corresponding to one of an earliest stored buffer information and a latest stored buffer information from the identified storage buffer. In FIG. 4B, buffer information corresponding to the earliest of the stored buffer information is retrieved from the identified storage buffer.

In an embodiment, the processor module 208 may perform both the identification and the retrieval repeatedly in a cyclic manner, starting from the lowest temporal level buffer to a highest temporal level buffer of the plurality of buffers so as to retrieve the buffer information associated with the plurality of picture buffers in an encoding order sequence 410. For example, upon the storing of buffer information corresponding to picture buffer Pg, (e.g., upon completion of the storing of buffer information corresponding to the picture buffers for the first GOP 404a), the processor module 208 may identify the storage buffer 1 as the lowest temporal level non-empty storage buffer corresponding to the first GOP 404a and retrieve Pg from the storage buffer 1. Subsequently, when $B_9$ is received by the memory module 206 and is being stored in the storage buffer 4 based on the associated temporal level, simultaneously, the processor module 208 identifies storage buffer 2 as the lowest temporal level non-empty storage buffer and retrieves $B_4$ from the storage buffer 2.

Buffer information for $B_2$ and $B_6$ may be retrieved in a similar manner. Subsequently, when $B_{12}$ is received by the memory module 206 and is stored in the storage buffer 2 based on the associated temporal level, simultaneously, the processor module 206 identifies storage buffer 4 as the lowest temporal level non-empty storage buffer and retrieves $B_1$ from the storage buffer 4. It is noted that although storage buffer 2 is the lowest temporal level non-empty buffer, the lowest temporal level storage buffer with respect to the first GOP 404a is identified, and, accordingly, storage buffer 4 is identified. Retrieval of the buffer information for the second GOP 404b may similarly be performed, and the buffer information corresponding to the plurality of picture buffers may be retrieved in the order of encoding as depicted in the encoding order sequence 410.

Figure 5A:
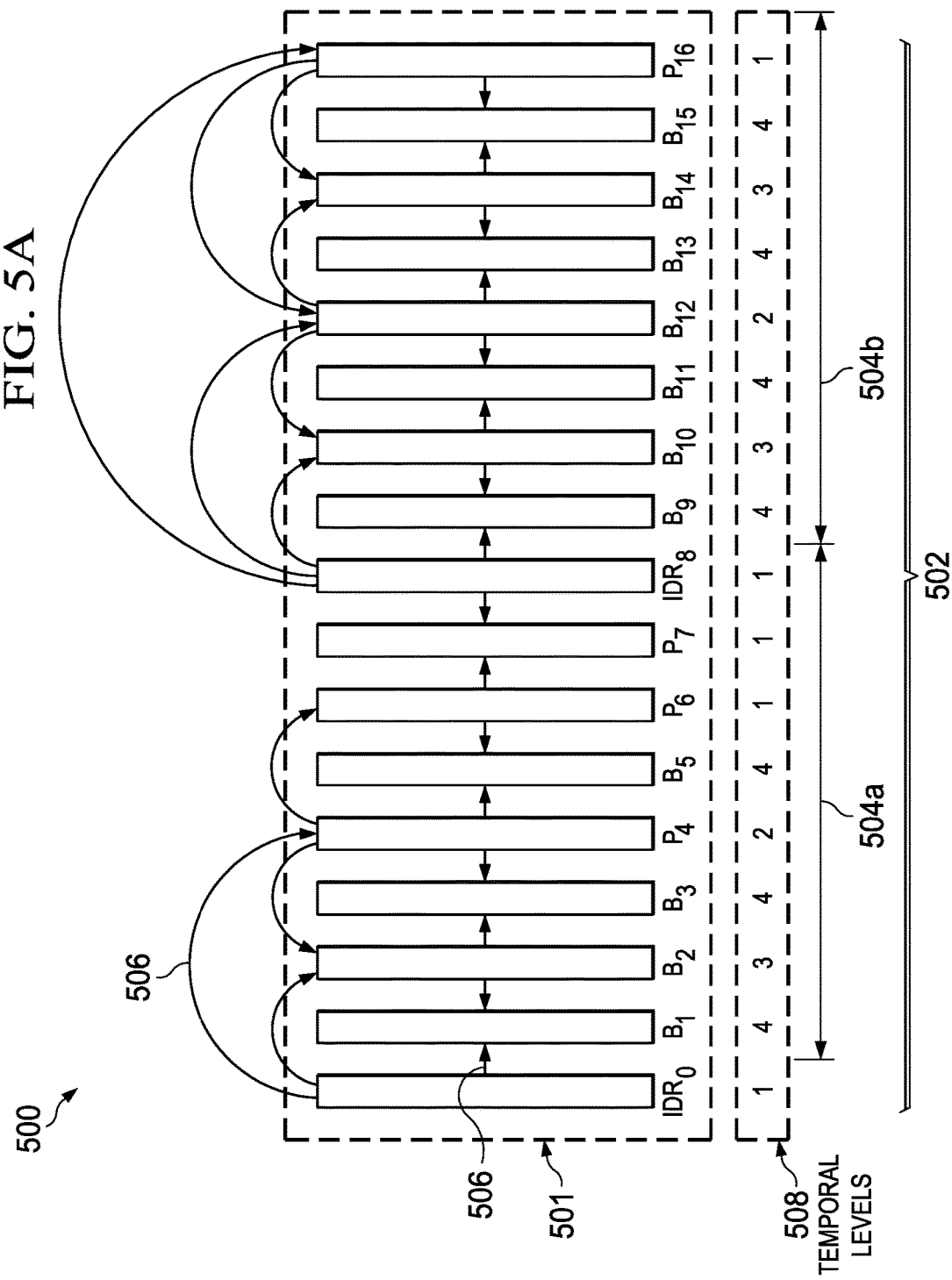

FIGS. 5A and 5B illustrate a retrieving of the buffer information in an order of encoding upon receiving an IDR frame insertion request in the GOP structure 400 of FIG. 4A according to an embodiment. In FIG. 5A, the IDR frame insertion request is received at $P_8$ of the GOP structure 400 of FIG. 4A so as to configure a revised GOP structure 500. As explained in FIG. 2, upon receiving the IDR frame insertion request, the buffer information module 204 converts the buffer information associated with the picture buffer at which the IDR frame insertion request is received into the buffer information corresponding to the IDR frame. Accordingly, the buffer information module 204 converts $P_8$ into the IDR frame $IDR_8$.

An insertion of the $IDR_8$ frame prevents reference into one or more future picture buffers (for example, one or more picture buffers succeeding the $IDR_8$ frame in the order of capture) by picture buffers preceding $IDR_8$. One or more B-frames belonging to the first GOP 404a corresponding to $IDR_8$, preceding $IDR_8$ and requiring reference from one or more subsequent frames in the order of capture are selected for conversion into P-frames. The selection is performed iteratively starting from a lowest capture index to a highest capture index of the multimedia frames in the order of capture. Also B-frames with a temporal level different from the temporal level of $P_8$ are selected.

Accordingly, subsequent to the conversion of Pg into $IDR_8$, the buffer information module 204 may select one or more picture buffers corresponding to B-frames preceding the picture buffer in the order of capture and corresponding to the first GOP 404a associated with the picture buffer. As explained in FIG. 2, each of the selected one or more picture buffers comprise at least one of an associated temporal level different than a temporal level associated with one of the picture buffers at which the IDR frame insertion is received, and an associated capture index higher than a capture index of a previously selected picture buffer corresponding to the B-frame within the GOP. Accordingly, three B-frames $B_4$, $B_6$ and $B_7$ may be selected as the associated temporal level that is different than the temporal level 1 associated with $P_8$ and the capture indices 4, 6 and 7 are lower than the capture index 8 of $P_8$. The B-frame $B_5$ is not selected, as it does not refer to any future frames (e.g. frames with higher capture index than 8). As explained in FIG. 2, the buffer information configured for at least one of the selected one or more picture buffers from the buffer information corresponding to the B-frames is converted into buffer information corresponding to the P-frames. Accordingly, $B_4$, $B_6$ and $B_7$ may be converted into $P_4$, $P_6$ and $P_7$ (P-frames). Accordingly, the GOP structure 400 is revised to the GOP structure 500, which includes a plurality of picture buffers 501 in a revised sequence 502, a revised first GOP 504a and a revised second GOP 504b, as shown in FIG. 5A. The arrows, such as arrows 506, depicted in FIG. 5A illustrate a dependence of a picture buffer on other picture buffers as reference frames for encoding purposes. Temporal levels 508 associated with the respective picture buffers are also depicted in FIG. 5A.

As explained in FIG. 2, in an embodiment, in order to perform the conversion, the buffer information module 204 extracts the buffer information from the selected one or more picture buffers from one of the plurality of storage buffers, modifies the extracted buffer information from buffer information corresponding to the B-frames into buffer information corresponding to the P-frames, and transfers the modified buffer information corresponding to the P-frames into a storage buffer associated with a lowest temporal level from among the temporal levels associated with the plurality of storage buffers. Furthermore, selection of the one or more picture buffers corresponding to the B-frames from a storage buffer associated with lowest temporal level to a storage buffer associated with the highest temporal level from among the plurality of storage buffers is performed repeatedly.

Accordingly, the buffer information corresponding to $B_4$, $B_6$, and $B_7$ are retrieved from the storage buffers 2, 3 and 4, respectively, and modified into buffer information associated with $P_4$, $P_6$, and $P_7$. Subsequent to the conversion, the buffer information associated with $P_4$, $P_6$, and $P_7$ are transferred to storage buffer 1 as illustrated in FIG. 5B. Furthermore, in an embodiment, upon transferring the buffer information associated with $P_4$, $P_6$, and $P_7$ into the storage buffer 1, the GOP is incremented to the second GOP 202b and the picture buffers of the first GOP buffer information are retrieved for encoding, starting from $IDR_8$. The buffer information associated with $IDR_8$, $P_4$, $P_6$, and $P_7$ frames are retrieved and lined up for encoding in an encoding order sequence 510, as illustrated in FIG. 5B.

Subsequent to retrieving $P_7$ from storage buffer 1, when $B_{12}$ is received, the lowest temporal level non-empty storage buffer is storage buffer 3, which contains buffer information associated with $B_{10}$ and $B_2$. Since $B_2$ belongs to the revised first GOP 504a of $IDR_8$, the buffer information associated with $B_2$ is retrieved from the storage buffer 3 and is lined up for encoding after $P_7$. Similarly $B_1$, $B_3$, $B_5$, and $P_{16}$ are subsequently lined up for encoding in the encoding order sequence 510.

Figure 6A:
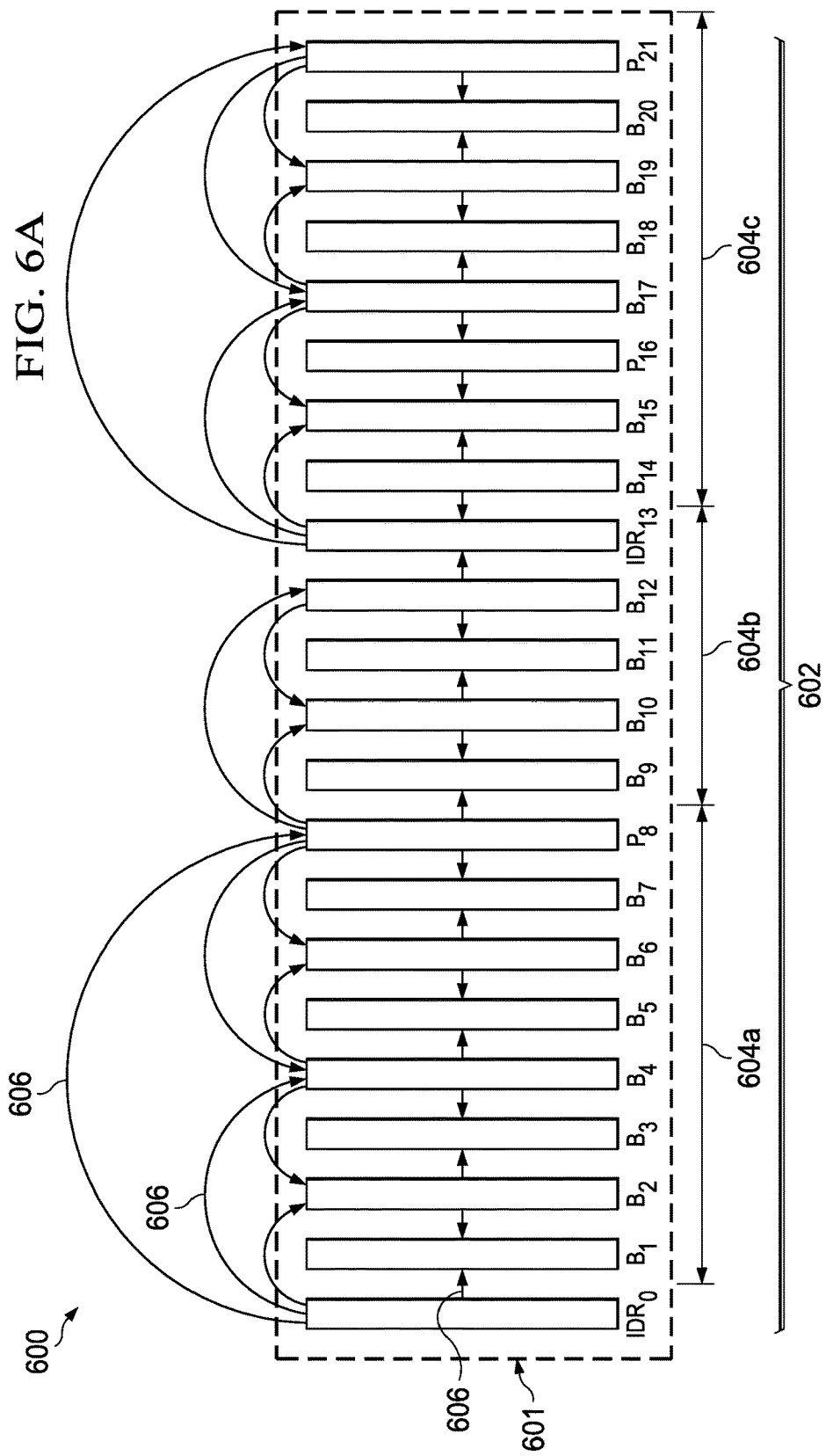

FIGS. 6A and 6B illustrate a retrieving of the buffer information in an order of encoding upon receiving a IDR frame insertion request in the GOP structure 400 of FIG. 4A according to an embodiment. In FIG. 6A, the IDR frame insertion request is received at $B_{13}$ of the GOP structure 400 depicted in FIG. 4A so as to configure a revised GOP structure 600. Also, the GOP structure 600 includes additional picture buffers $B_{17}$-$P_{21}$, as illustrated in FIG. 6A. As explained earlier in FIG. 2, upon receiving the IDR frame insertion request, the buffer information module 204 converts the buffer information associated with the picture buffer at which the IDR frame insertion request is received into the buffer information corresponding to the DR frame. Accordingly, the buffer information module 204 converts $B_{13}$ into the IDR frame $IDR_{13}$.

Furthermore, a GOP is incremented, and the GOP structure 600 includes a plurality of picture buffers 601 in a revised sequence 602. The revised sequence 602 includes three GOPS, wherein a first GOP 604a includes picture buffers $B_1$, $B_2$, $B_3$, $B_4$, $B_5$, $B_6$, $B_7$, and $P_8$, a second GOP 604b includes picture buffers $B_9$, $B_{10}$, $B_{11}$, $P_{12}$, and $IDR_{13}$, and a third GOP 604c includes the multimedia frames $B_{14}$, $B_{15}$, $B_{16}$, $B_{17}$, $B_{18}$, $B_{19}$, $B_{20}$, and $P_{21}$. The arrows, such as arrows 606, depicted in FIG. 6A illustrate a dependence of a picture buffer on other picture buffers as reference frames for encoding purposes. An insertion of the $IDR_{13}$ frame prevents reference into one or more future picture buffers (for example, one or more picture buffers succeeding the $IDR_{13}$ frame in the order of capture) by picture buffers preceding $IDR_{13}$. One or more B-frames belonging to the second GOP 604a corresponding to $IDR_{13}$ and preceding $IDR_{13}$ and requiring reference from one or more subsequent frames in the order of capture are selected for conversion into P-frames. The selection is performed iteratively starting from a lowest capture index to a highest capture index of the multimedia frames in the order of capture. Also B-frames with a temporal level different from the temporal level of $B_{13}$ (e.g., temporal level 4) are selected.

Accordingly, subsequent to the conversion of $B_{13}$ into $IDR_{13}$, the buffer information module 204 may select one or more picture buffers corresponding to B-frames preceding the picture buffer corresponding to IDR13 in the order of capture and corresponding to the second GOP 604b associated with the picture buffer. As explained earlier in FIG. 2, each of the selected one or more picture buffers comprise at least one of an associated temporal level that is different than a temporal level associated with one of the picture buffers at which the IDR frame insertion is received and an associated capture index that is higher than a capture index of a previously selected picture buffer corresponding to the B-frame within the GOP.

The selection may be performed, for example, iteratively starting from temporal level 1 to temporal level 4. The multimedia frame $B_{12}$ belongs to the second GOP 604b, precedes the $IDR_{13}$, and is associated with temporal level 2, which is different from temporal level 4 of $B_{13}$, and, hence, is selected. The buffer information associated with $B_{12}$ is retrieved from the storage buffer 2 and modified into buffer information associated with $P_{12}$. Subsequent to the conversion, the buffer information associated with P12 is transferred into the storage buffer 1, as illustrated in FIG. 6B. Furthermore, the storage buffer associated with the next higher temporal level 3 is buffer storage buffer 3. The latest buffer information in buffer storage buffer 3 is $B_{10}$, which belongs to the second GOP 604b, but is associated with a capture index of 10 lower than a capture index 12 of $B_{12}$, which was previously selected, and, hence, $B_{10}$ is not selected. Since the next higher temporal level is temporal level 4, which matches the temporal level of $B_{13}$, none of the picture buffers from buffer storage buffer 4 are selected. Subsequent to the transfer of the buffer information associated with $P_{12}$ into storage buffer 1, the GOP structure 400 of FIG. 4A is revised to the GOP structure 600 of FIG. 6A. As illustrated in FIG. 6A none of the picture buffers of the second GOP 604b hold reference to $IDR_{13}$, which is contrary to the picture buffers of the second GOP 404b of FIG. 4A. The subsequently captured picture buffers of the GOP structure 600 are retrieved in the order of encoding so as to configure the encoding order sequence 608 based on the mechanism described previously with respect to FIGS. 4A and 4B.

The buffer information corresponding to the encoding order sequence 608 may be provided to the multimedia encoder, such as the multimedia encoder 100, so as to encode the plurality of picture buffers corresponding to the multimedia data. A method for picture buffer facilitation is explained in FIG. 7.

Figure 7:
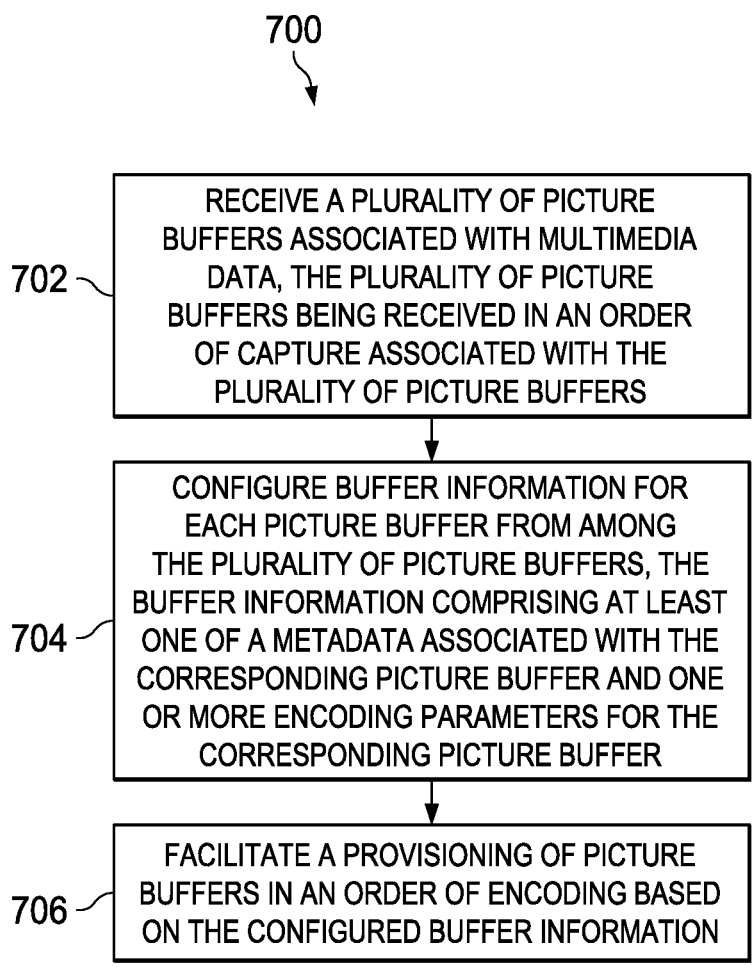
FIG. 7 is a flow diagram of a method for facilitating multimedia data encoding according to an embodiment.

FIG. 7 is a flow diagram of a method 700 for facilitating multimedia data encoding according to an embodiment. The method 700 starts at operation 702. At operation 702, a plurality of picture buffers associated with multimedia data are received (for example, by buffer information module of FIG. 2) in an order of capture associated with the plurality of picture buffers. The picture buffers may correspond to multimedia frames of the multimedia data and may be received from one of a multimedia capture device (for example, a video camera) and a temporary memory configured to store the picture buffers received from the multimedia capture device. Examples of the temporary memory may include, but are not limited to, random access memory (RAM), read only memory (ROM), synchronous dynamic RAM (SDRAM) and double data rate SDRAM (DDR SDRAM).

In an embodiment, the captured multimedia frames may be grouped into one or more group of pictures (GOPs). In an embodiment, a GOP may include multimedia frames from one key frame, such as an I-frame, a P-frame or an IDR frame, to another key frame. For example, if a sequence of captured multimedia frames is IBBBPBBBBI, then a first GOP may include multimedia frames from the I-frame in the beginning of the sequence to the P-frame such that the first GOP includes multimedia frames in the sequence BBBP. Similarly, the second GOP may include multimedia frames from the P-frame to the I-frame located at the end of the sequence of multimedia frames such that the second GOP includes multimedia frames in the sequence BBBBI. A GOP structure may be configured to include multimedia frames from one I-frame to another I-frame. Accordingly, in the exemplary sequence of captured multimedia frames of IBBBPBBBBI, the GOP structure may include multimedia frames in the sequence BBBPBBBBI. Such a GOP structure may include, for example, the first GOP and the second GOP. In an embodiment, each captured multimedia frame may be associated with a current GOP number indicating to which GOP the captured multimedia frame belongs.

At operation 704, buffer information is configured (for example, by the buffer information module 204) for each picture buffer from among the plurality of picture buffers. In an embodiment, in the buffer information comprises at least one of one or more encoding parameters for the corresponding picture buffer, and metadata associated with the corresponding picture buffer and/or the multimedia data. Examples of the metadata associated with the plurality of picture buffers and/or the multimedia data include, but are not limited to, information associated with a buffer address of each picture buffer, type of the multimedia frames (e.g., I-frames, P-frames, B-frames, and the like), a current GOP number to which a buffered multimedia frame belongs, a capture index of the multimedia frame, a buffer pointer of a scaling matrix to be used for the multimedia frame, and the like. Examples of the encoding parameter include, but are not limited to, one or more scaling matrices to be used for the multimedia frames, coordinates of the region of interest for encoding, and the like. At operation 706, a provision of picture buffers in an order of encoding is facilitated based on the buffer information configured for each picture buffer from among the plurality of picture buffers. In an embodiment, facilitating a provision of the picture buffers comprises identifying a temporal level from among a plurality of pre-determined temporal levels for each picture buffer from among the plurality of picture buffers based on the buffer information configured for each picture buffer. In an embodiment, a temporal level for each picture buffer may be determined (for example, by memory module 206) based on the buffer information associated with each picture buffer, as explained in FIG. 2.

Facilitating a provision of the picture buffers in the order of encoding further comprises storing buffer information configured for each picture buffer in a storage buffer from among a plurality of storage buffers (such as storage buffers 206a-206n, which are configured to store the buffer information) based on the temporal level of each picture buffer and a temporal level associated with each storage buffer from among the plurality of storage buffers. Examples of the storage buffers include, but are not limited to, a first in first out (FIFO) buffer, a last in first out (LIFO) buffer, and the like. The pre-determined temporal levels may correspond to a number of temporal levels in the GOP structure. In an exemplary embodiment, the pre-determined number of temporal levels is four. Accordingly, four storage buffers each associated with a temporal level may be allocated to store the buffer information configured for the plurality of picture buffers.

In an embodiment, a temporal level of a picture buffer may be matched with a temporal level of a storage buffer, and, upon confirmation of a match, the buffer information corresponding to the picture buffer may be stored in the respective storage buffer. In an embodiment, the buffer information configured for a picture buffer corresponding to one of an I-frame, an instantaneous decoding refresh (IDR) frame, and a P-frame is stored in a storage buffer from among the plurality of storage buffers associated with a lowest temporal level from among the plurality of pre-determined temporal levels. In an embodiment, the buffer information configured for a picture buffer corresponding to a B-frame or a P-frame is stored in a storage buffer from among the plurality of buffers associated with higher temporal levels than the lowest temporal level of the plurality of pre-determined temporal levels, as explained in FIG. 3.

The buffer information configured for the picture buffers is subsequently retrieved in the order of encoding from the plurality of storage buffers upon completion of the storing of buffer information corresponding to picture buffers associated with a pre-determined GOP. In an embodiment, in order to retrieve the buffer information, a storage buffer from among the plurality of storage buffers including buffer information corresponding to at least one picture buffer associated with the GOP is identified such that the identified storage buffer is associated with a lowest temporal level from among the temporal levels associated with the plurality of storage buffers including the buffer information. Furthermore, buffer information is retrieved from the identified storage buffer, such that the buffer information corresponds to an earliest stored buffer information or a latest stored buffer information in the identified storage buffer. The retrieving of the buffer information may be performed as explained in FIGS. 4A and 4B. In an embodiment, encoding of the picture buffers is initiated based on the retrieved buffer information in the order of encoding. In an embodiment, the encoded picture buffers are rendered available as reference picture buffers for the encoding of subsequent picture buffers thereby facilitating an uninterrupted encoding of picture buffers upon initiation of encoding. Another method for picture buffer facilitation is explained in FIG. 8.

Figure 8A:
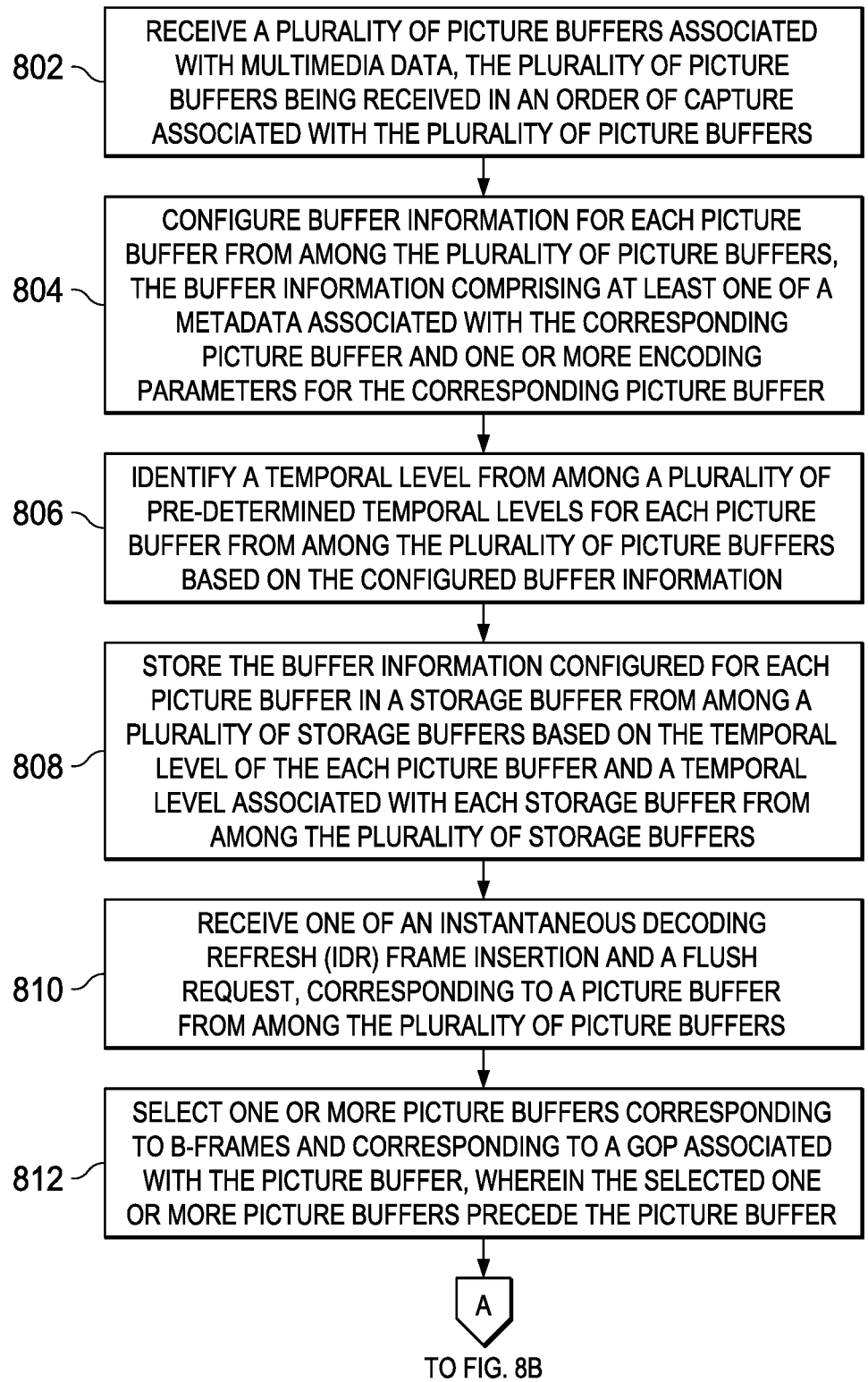
FIGS. 8A and 8B depict a flow diagram of a method for facilitating multimedia data encoding according to another embodiment.
Figure 8B:
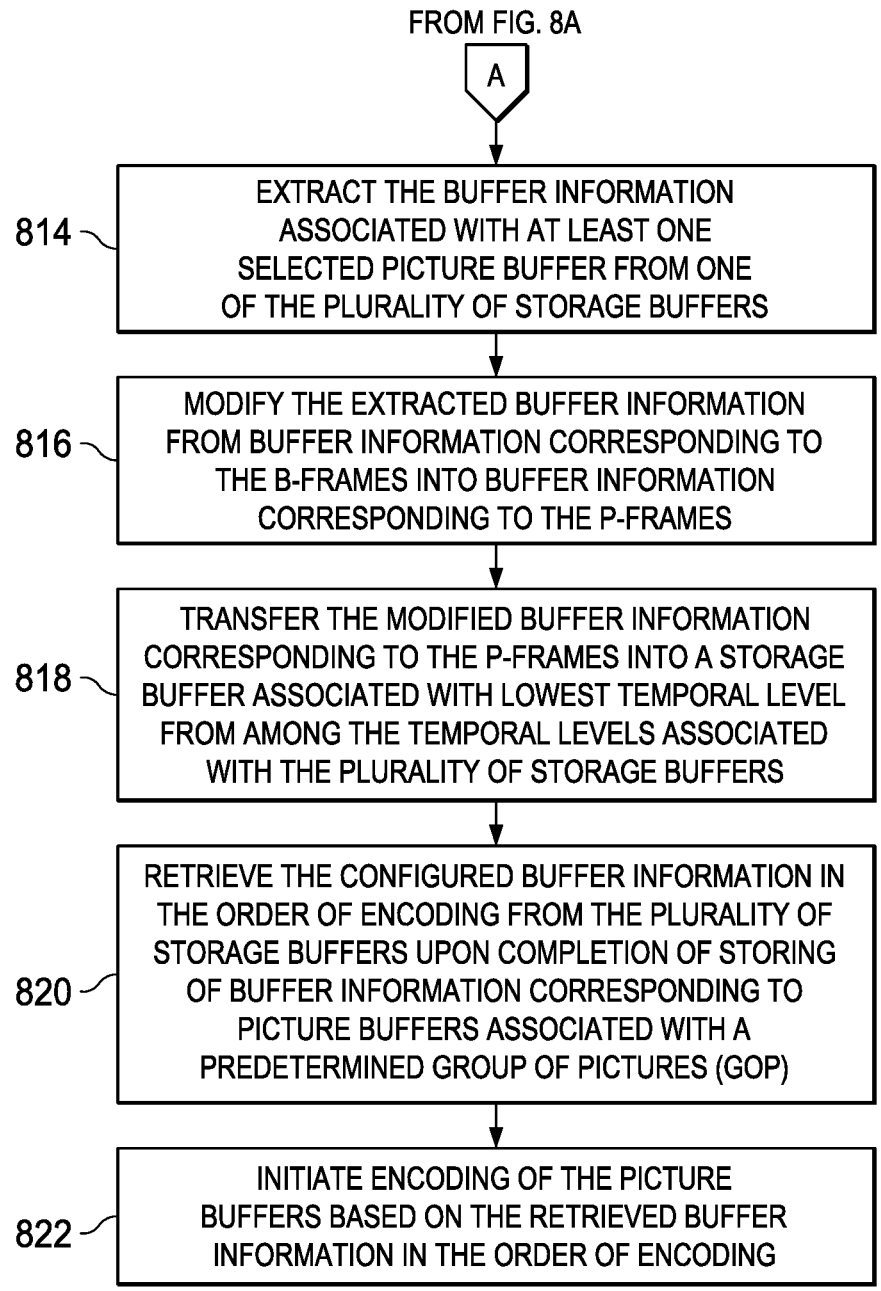

FIGS. 8A and 8B depict a flow diagram of a method 800 for facilitating multimedia data encoding according to another embodiment. The method 800 starts at operation 802. At operation 802, a plurality of picture buffers associated with multimedia data are received (for example, by buffer information module 204 of FIG. 2) in an order of capture associated with the plurality of picture buffers. The picture buffers may correspond to multimedia frames of the multimedia data and may be received from one of a multimedia capture device (for example, a video camera) and a temporary memory configured to store the picture buffers received from the multimedia capture device. In an embodiment, the captured multimedia frames may be grouped into one or more groups of pictures (GOPs). In an embodiment, a GOP may include multimedia frames from one key frame, such as an I-frame, a P-frame or an IDR frame, to another key frame. In an embodiment, each captured multimedia frame may be associated with a current GOP number indicating a GOP to which the captured multimedia frame belongs.

At operation 804, buffer information for each picture buffer from among the plurality of picture buffers is configured (for example, by buffer information module 204 of FIG. 2). In an embodiment, the buffer information comprises at least one of one or more encoding parameters associated with the corresponding picture buffer, and metadata associated with the corresponding picture buffer and/or the multimedia data. Examples of the metadata associated with the plurality of picture buffers and/or the multimedia data, include, but are not limited to, information associated with a buffer address of each picture buffer, type of the multimedia frames (e.g., I-frames, P-frames, B-frames, and the like), a current GOP number indicative of a GOP to which that a buffered multimedia frame belongs, a capture index of the multimedia frame, a buffer pointer of a scaling matrix to be used for the multimedia frame, and the like. Examples of the encoding parameter include, but are not limited to, one or more scaling matrices to be used for the multimedia frames, coordinates of the region of interest for encoding, and the like.

At operation 806, a temporal level from among a plurality of pre-determined temporal levels is identified (for example, by memory module 206 of FIG. 2) for each picture buffer from among the plurality of picture buffers based on the buffer information configured for each picture buffer. The term 'temporal level' as used herein may be construed as a relative measure of dependence in encoding of a picture buffer on other picture buffers. Accordingly, the higher a temporal level associated with a picture buffer, the more dependent the picture buffer is on other picture buffers for encoding purposes and the picture buffer is less likely to be referred by other picture buffers for encoding purposes. For example, the key frames, such as I-frame, P-frame or an IDR-frame are relatively less dependent on other multimedia frames (e.g., relatively independent) than B-frames, and, accordingly, the corresponding picture buffers may be associated with the lower temporal level. In an embodiment, a number of the B-frames do not have same measure of dependence on other frames. For example, some B-frames may refer to x frames in a temporally succeeding order of capture and y frames in a temporally preceding order of capture, while some frames may refer to 'x-1' frames in a temporally succeeding order of capture and 'y-1' frames in a temporally preceding order of capture. Accordingly, based on a higher or lower measure of dependency, the corresponding picture buffers may be associated with higher or lower temporal levels. In an embodiment, a GOP structure may include a plurality of temporal levels.

At operation 808, the buffer information configured for each picture buffer is stored (for example by buffer information module 204 of FIG. 2) in a storage buffer from among a plurality of storage buffers (for example, storage buffers 206a to 206n of FIG. 2) based on the temporal level of each picture buffer and a temporal level associated with each storage buffer from among the plurality of storage buffers. In an embodiment, each storage buffer from among the plurality of storage buffers may also be associated with a temporal level of a plurality of pre-determined temporal levels.

In an embodiment, a temporal level of a picture buffer may be matched with a temporal level of a storage buffer, and, upon confirmation of a match, the buffer information corresponding to the picture buffer may be stored in the respective storage buffer. In an embodiment, the buffer information associated with a key frame (e.g., I-frame, IDR frame or P-frame) is stored in a storage buffer associated with a lowest temporal level, and buffer information associated with a B-frame may be stored in a storage buffer associated with a higher temporal level than the lowest temporal level of the plurality of pre-determined temporal levels. In an embodiment, the buffer information associated with a P-frame may be stored in a storage buffer associated with a higher temporal level than the lowest temporal level of the plurality of pre-determined temporal levels. The storing of the buffer information is as explained in FIG. 3.

At operation 810, one of an instantaneous decoding refresh (IDR) frame insertion request and a flush request corresponding to a picture buffer from among the plurality of picture buffers is received. In an embodiment, upon receiving the IDR frame insertion request, the buffer information associated with the picture buffer at which the IDR frame insertion request is received is converted into the buffer information corresponding to the IDR frame. For example, if an IDR frame insertion request is received at B-frame with a capture index 8 (e.g., $B_8$) in a GOP, the B-frame is converted into an IDR frame with a capture index 8 (e.g., $IDR_8$).

At operation 812, one or more picture buffers corresponding to B-frames and corresponding to a GOP associated with the picture buffer is selected (for example, by processor module 208 of FIG. 2) such that the selected one or more picture buffers precede the picture buffer. In an embodiment, each of the selected one or more picture buffers comprise at least one of an associated temporal level that is different than a temporal level associated with the picture buffer at which the IDR frame insertion request or the flush request is received and an associated capture index that is higher than a capture index of a previously selected picture buffer corresponding to the B-frame within the GOP. In an embodiment, selection of the one or more picture buffers corresponding to the B-frames is performed repeatedly from a storage buffer associated with a lowest temporal level to a storage buffer associated with the highest temporal level from among the plurality of storage buffers.

At operation 814, buffer information associated with at least one selected picture buffer from one of the plurality of storage buffers is extracted (for example, by buffer information module 204 of FIG. 2). At operation 816, the extracted buffer information is modified from buffer information corresponding to the B-frames into buffer information corresponding to the P-frames. Furthermore, at operation 818, the modified buffer information corresponding to the P-frames is transferred into a storage buffer associated with a lowest temporal level from among the temporal levels associated with the plurality of storage buffers. The selection, extraction, and the modification may be performed, for example, as explained herein with reference to FIGS. 5A and 5B and FIGS. 6A and 6B.

At operation 820, the buffer information configured for the picture buffers is retrieved (for example, by processor module 208 of FIG. 2) in the order of encoding from the plurality of storage buffers upon a completion of a storing of buffer information corresponding to picture buffers associated with a pre-determined GOP. The retrieving of the buffer information is explained herein with reference to FIGS. 4A and 4B. At operation 822, the encoding of the picture buffers is initiated (for example, by multimedia encoder 100 of FIG. 1) based on the retrieved buffer information in the order of encoding.

Without in any way limiting the scope, interpretation, or application of the claims appearing below, advantages of one or more of the exemplary embodiments disclosed herein include providing picture buffers corresponding to the multimedia frames in the order of encoding to the multimedia encoder without much overheads, thereby precluding any degradation in a quality of encoding of the multimedia data. Furthermore, various embodiments of the present technology enable scalability to different GOP structures including, for example, III, IPP, IBBP, BBIBBP, and the like and to multiple levels of temporal prediction. The various embodiments of the present technology are operable under dynamic changes in GOP structures including the change in GOP structure initiated from a key frame. Further, in an IDR frame insertion scenario, the method and system disclosed herein enable conversion of an optimal number of B-frames into P-frames without much complexity overhead. Additionally, such an insertion precludes any change in decoded picture buffer logic within a multimedia core encoder. Moreover, a reference picture used during motion compensation remains unchanged and subsequent to conversion of B-frames into P-frames, the converted P-frames refer to the same preceding frames for motion compensation as referred by the B-frames prior to conversion, thereby allowing handling of the IDR frame insertion without changing the decoded picture buffer logic.

Although the present technology has been described with reference to specific exemplary embodiments, it is noted that various modifications and changes may be made to these embodiments without departing from the broad spirit and scope of the present technology. For example, the various devices, modules, analyzers, generators, etc., described herein may be enabled and operated using hardware circuitry (e.g., complementary metal oxide semiconductor (CMOS) based logic circuitry), firmware, software and/or any combination of hardware, firmware, and/or software (e.g., embodied in a machine readable medium). For example, the various electrical structures and methods may be embodied using transistors, logic gates, and electrical circuits (e.g., application specific integrated circuit (ASIC) circuitry and/or in Digital Signal Processor (DSP) circuitry).

Particularly, the system 202 of FIG. 1, the buffer information module 204, the memory module 206, and the processor module 208 of FIG. 2 may be enabled using software and/or using transistors, logic gates, and electrical circuits (e.g., integrated circuit circuitry such as ASIC circuitry).

Embodiments of the present disclosure include one or more computer programs stored or otherwise embodied on a computer-readable medium, wherein the computer programs are configured to cause a processor to perform one or more operations. A computer-readable medium storing, embodying, or encoded with a computer program, or similar language, may be embodied as a tangible data storage device storing one or more software programs that are configured to cause a processor to perform one or more operations. Such operations may be, for example, any of the steps or operations described herein. Additionally, a tangible data storage device may be embodied as one or more volatile memory devices, one or more non-volatile memory devices, and/or a combination of one or more volatile memory devices and non-volatile memory devices.

Also, techniques, devices, subsystems and methods described and illustrated in the various embodiments as discrete or separate may be combined or integrated with other systems, modules, techniques, or methods without departing from the scope of the present technology. Other items shown or discussed as directly coupled or communicating with each other may be coupled through some interface or device, such that the items may no longer be considered directly coupled with each other but may still be indirectly coupled and in communication, whether electrically, mechanically, or otherwise, with one another. Other examples of changes, substitutions, and alterations ascertainable by one skilled in the art, upon studying the exemplary embodiments disclosed herein, may be made without departing from the spirit and scope of the present technology.

It should be noted that reference throughout this specification to features, advantages, or similar language does not imply that all of the features and advantages should be or are in any single embodiment. Rather, language referring to the features and advantages may be understood to mean that a specific feature, advantage, or characteristic described in connection with an embodiment may be included in at least one embodiment of the present technology. Thus, discussions of the features and advantages, and similar language, throughout this specification may, but do not necessarily, refer to the same embodiment.

Various embodiments of the present disclosure, as discussed above, may be practiced with steps and/or operations in a different order, and/or with hardware elements in configurations which are different than those which are disclosed. Therefore, although the technology has been described based upon these exemplary embodiments, it is noted that certain modifications, variations, and alternative constructions may be apparent and well within the spirit and scope of the technology.

Although various exemplary embodiments of the present technology are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A method comprising:
configuring a first buffer information for a first picture buffer, the first buffer information comprising metadata associated with the first picture buffer;
identifying a first temporal level for the first picture buffer from among a plurality of pre-determined temporal levels based on the configured first buffer information;
identifying a second temporal level for a second picture buffer;
storing the first buffer information for the first picture buffer in a first storage buffer corresponding to the first temporal level of the first picture buffer;
storing a second buffer information for the second picture buffer in a second storage buffer corresponding to the second temporal level of the second picture buffer;
retrieving the first buffer information from the first picture buffer and second buffer information from the second picture buffer in an order of encoding for the first and second picture buffers;
receiving an instantaneous decoding refresh (IDR) frame insertion request and a flush request corresponding to the first picture buffer; and
converting the first buffer information from buffer information corresponding to bi-directional coded frames (B-frames) into buffer information corresponding to predictive coded frames (P-frames).

2. The method of claim 1, wherein the first buffer information further comprises an encoding parameter for the first picture buffer.

3. The method of claim 1, wherein the first buffer information configured for the first picture buffer corresponding to one of an intra coded frame (I-frame), an instantaneous decoding refresh (IDR) frame, and a P-frame is stored in the first storage buffer, the first storage buffer is associated with a lowest temporal level from among the plurality of pre-determined temporal levels.

4. The method of claim 1, wherein the first buffer information corresponds to at least one of a B frame and a P-frame.

5. The method of claim 1, further comprising:
encoding the first and second picture buffers based on the retrieved first and second buffer information.

6. The method of claim 1, wherein the first picture buffer comprises at least one of:
an associated temporal level different than a temporal level associated with the first picture buffer at which one of the IDR frame insertion and the flush request is received; and
an associated capture index higher than a capture index of the second picture buffer.

7. The method of claim 1, wherein converting the first buffer information comprises:
extracting the first buffer information;
modifying the extracted first buffer information from buffer information corresponding to the B-frames into buffer information corresponding to the P-frames; and
transferring the modified buffer information corresponding to the P-frames into the first storage buffer.

8. A system comprising:
a memory module configured to:
configure a first buffer information for a first picture buffer, the first buffer information comprising metadata associated with the first picture buffer;
identify a first temporal level for the first picture buffer from among a plurality of pre-determined temporal levels based on the configured first buffer information;
identify a second temporal level for a second picture buffer;
store the first buffer information for the first picture buffer in a first storage buffer corresponding to the first temporal level of the first picture buffer;
store a second buffer information for the second picture buffer in a second storage buffer corresponding to the second temporal level of the second picture buffer;
a processor module configured to retrieve the first buffer information from the first picture buffer and second buffer information from the second picture buffer in an order of encoding for the first and second picture buffers; and
a buffer information module configured to receive an instantaneous decoding refresh (IDR) frame insertion request and a flush request corresponding to the first picture buffer and to convert the first buffer information from buffer information corresponding to bi-directional coded frames (B-frames) into buffer information corresponding to predictive coded frames (P-frames).

9. The system of claim 8, wherein the first buffer information further comprises an encoding parameter for the first picture buffer.

10. The system of claim 8, wherein the first buffer information configured for the first picture buffer corresponding to one of an intra coded frame (I-frame), an instantaneous decoding refresh (IDR) frame, and a predictive coded frame (P-frame) is stored in the first storage buffer, the first storage buffer is associated with a lowest temporal level from among the plurality of pre-determined temporal levels.

11. The system of claim 8, wherein the first picture buffer comprises at least one of:
an associated temporal level different than a temporal level associated with the first picture buffer at which one of the IDR frame insertion and the flush request is received; and
an associated capture index higher than a capture index of the second picture buffer.

12. The system of claim 8, wherein converting the first buffer information comprises:
extracting the first buffer information;
modifying the extracted first buffer information from buffer information corresponding to the B-frames into buffer information corresponding to the P-frames; and
transferring the modified buffer information corresponding to the P-frames into the first storage buffer.

13. A non-transitory computer-readable medium storing a set of instructions that when executed cause a computer to perform a method, the method comprising:
- configuring a first buffer information for a first picture buffer, the first buffer information comprising metadata associated with the first picture buffer;
- identifying a first temporal level for the first picture buffer from among a plurality of pre-determined temporal levels based on the configured first buffer information;
- identifying a second temporal level for a second picture buffer;
- storing the first buffer information for the first picture buffer in the first storage buffer corresponding to the first temporal level of the first picture buffer;
- storing a second buffer information for the second picture buffer in a second storage buffer corresponding to the second temporal level of the second picture buffer;
- retrieving the first buffer information from the first picture buffer and second buffer information from the second picture buffer in an order of encoding for the first and second picture buffers; and
- receiving an instantaneous decoding refresh (IDR) frame insertion request and a flush request corresponding to the first picture buffer;
- converting the first buffer information from buffer information corresponding to bi-directional coded frames (B-frames) into buffer information corresponding to predictive coded frames (P-frames).

14. The non-transitory computer-readable medium of claim 13, wherein the first buffer information further comprises an encoding parameter for the first picture buffer.

* * * * *